(12) United States Patent
Alexander

(10) Patent No.: US 8,398,357 B2
(45) Date of Patent: Mar. 19, 2013

(54) PARCEL DELIVERY TRUCK WITH LIFT OR HOIST UNIT

(76) Inventor: Larry Alexander, Indianapolis, IN (US)

( * ) Notice: Subject to any disclaimer, the term of this patent is extended or adjusted under 35 U.S.C. 154(b) by 1469 days.

(21) Appl. No.: 11/810,660

(22) Filed: Jun. 7, 2007

(65) Prior Publication Data
US 2008/0304946 A1  Dec. 11, 2008

(51) Int. Cl.
B60P 3/00 (2006.01)
B60P 1/54 (2006.01)

(52) U.S. Cl. .................. 414/546; 414/812; 212/180

(58) Field of Classification Search .............. 414/546, 414/542, 543, 541, 462, 812; 212/97, 177, 212/180, 261; 254/264, 326
See application file for complete search history.

(56) References Cited

U.S. PATENT DOCUMENTS

| | | | | |
|---|---|---|---|---|
| 2,571,361 A * | 10/1951 | Harmanson | ................... | 414/546 |
| 3,109,544 A * | 11/1963 | Learmont | ................... | 414/549 |
| 3,276,610 A * | 10/1966 | Thatcher | ................... | 414/541 |
| 3,572,513 A * | 3/1971 | Tantlinger et al. | ................... | 212/180 |
| 3,578,179 A * | 5/1971 | Fujioka | ................... | 212/180 |
| 3,768,671 A * | 10/1973 | LaVier | ................... | 414/556 |
| 4,383,791 A * | 5/1983 | King | ................... | 414/542 |
| 4,872,581 A * | 10/1989 | Wedhorn | ................... | 212/180 |
| 5,219,267 A * | 6/1993 | Kjendalen et al. | ................... | 414/812 |
| 5,232,329 A * | 8/1993 | Livingston | ................... | 414/494 |
| 5,348,439 A * | 9/1994 | Kuhn, Jr. | ................... | 414/543 |
| 5,357,143 A * | 10/1994 | Lehr et al. | ................... | 307/10.1 |
| 5,419,672 A * | 5/1995 | Poe | ................... | 414/540 |
| 5,532,521 A * | 7/1996 | Leininger | ................... | 307/10.2 |
| 5,743,702 A * | 4/1998 | Gunderson | ................... | 414/542 |
| 5,915,913 A * | 6/1999 | Greenlaw et al. | ................... | 414/679 |
| 6,799,935 B1 * | 10/2004 | Grollitsch | ................... | 414/546 |
| 7,048,491 B2 * | 5/2006 | Windbergs | ................... | 414/542 |
| 7,287,948 B2 * | 10/2007 | Knoell | ................... | 414/546 |
| 7,306,421 B2 * | 12/2007 | Wolfe | ................... | 414/541 |
| 7,568,877 B1 * | 8/2009 | Nespor | ................... | 414/545 |
| 7,713,019 B2 * | 5/2010 | Alexander | ................... | 414/812 |
| 7,717,662 B2 * | 5/2010 | Alexander | ................... | 414/546 |
| 2006/0045705 A1 * | 3/2006 | Knoell | ................... | 414/546 |
| 2007/0235257 A1 * | 10/2007 | Alexander | ................... | 182/127 |
| 2008/0279663 A1 * | 11/2008 | Alexander | ................... | 414/469 |
| 2008/0279668 A1 * | 11/2008 | Alexander | ................... | 414/607 |

* cited by examiner

Primary Examiner — Paul T Chin
(74) Attorney, Agent, or Firm — Daniel J. O'Connor

(57) ABSTRACT

A method of and system for delivering parcels or packages utilizing a parcel delivery truck. The method allows both lighter and heavier packages to be delivered by a single driver or operator. The method includes positioning a specially designed lift or hoist unit within a rear compartment of a parcel delivery truck. The left and right portions of the lift unit are mounted to left and right side walls of the rear compartment to provide maximum lifting efficiency and maximum space for heavier parcels carried in the rear compartment.

1 Claim, 4 Drawing Sheets

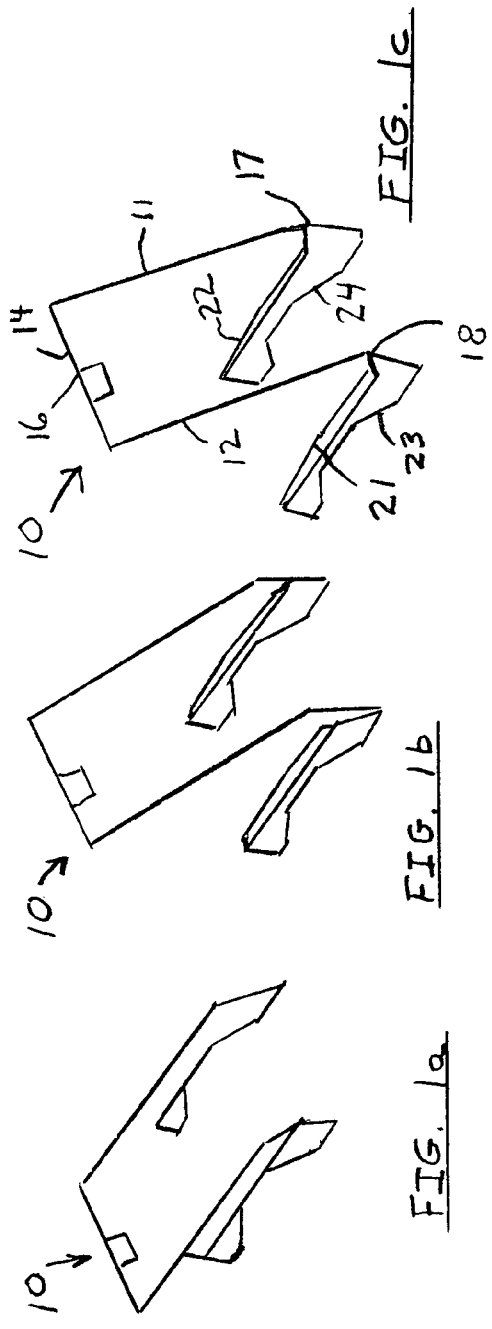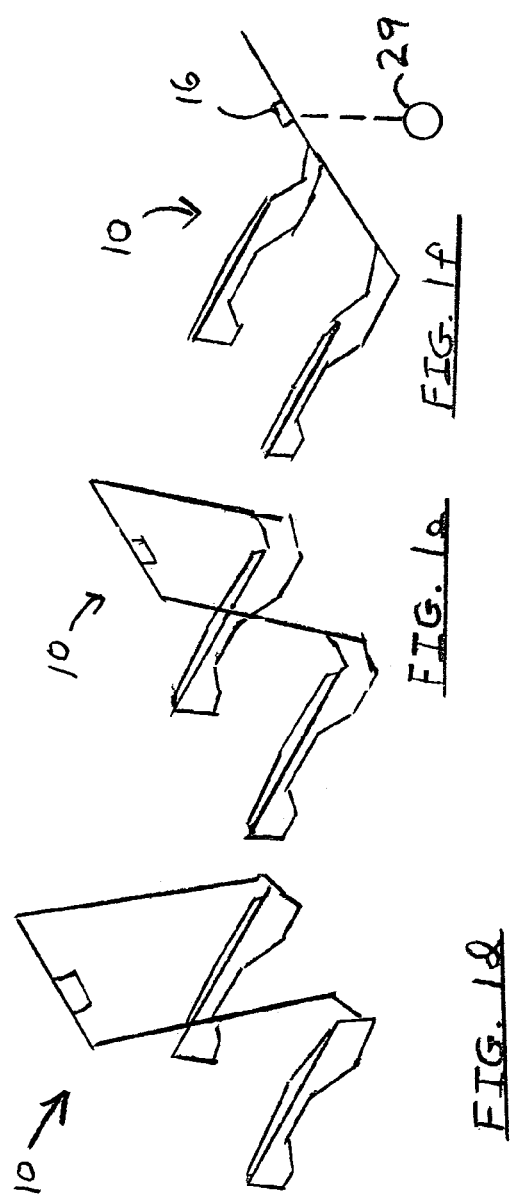

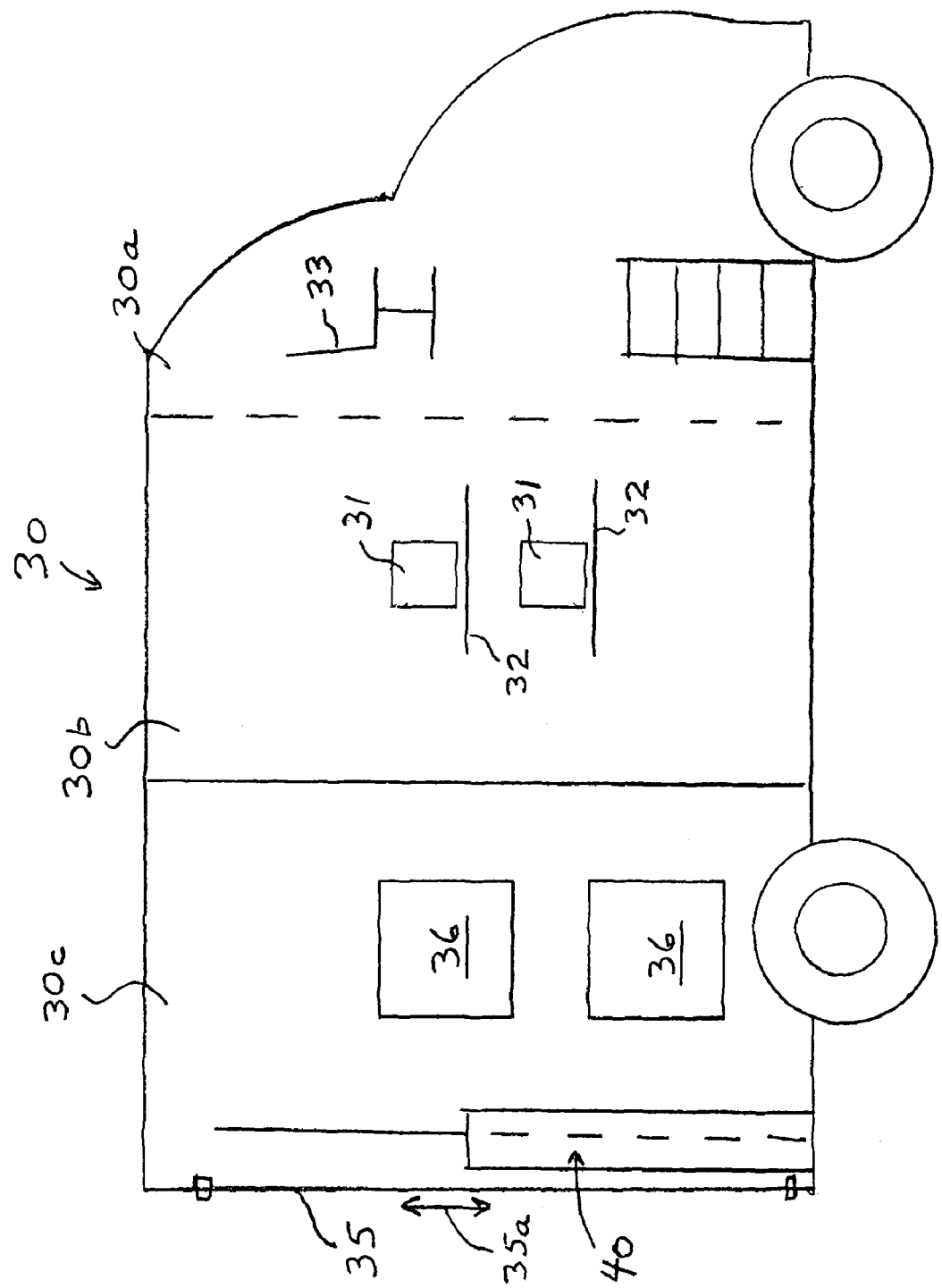

PARCEL DELIVERY TRUCK WITH LIFT OR HOIST UNIT

BACKGROUND AND OBJECTS OF THE INVENTION

The present invention is generally related to the parcel or package delivery arts and, in particular, to a novel system, method and business method for unloading parcels which are heavier in addition to lighter weight packages.

Parcel delivery trucks are typically driven and unloaded by a single operator/driver. This system works well for most major carriers. One drawback is that a single operator cannot unload heavier packages in the range of over one hundred pounds. Thus, a typical delivery truck is restricted to transport of relatively smaller packages.

It would therefore be advantageous to provide a hoist or lift system for parcel delivery trucks in order to be able to carry parcels of heavier weight.

Accordingly, it is an object of the present invention to demonstrate a novel hoist or lift system which may be readily added to a standard parcel delivery truck.

It is a further object of the invention to show a hoist or lift design which is installed in the rear interior compartment of a delivery truck so it is protected from weather elements and potential vandalism during the delivery process.

It is also an object to set forth a method of operation and business method which reduces operating costs by allowing a single parcel delivery truck and driver/operator to transport a large variety of packages by weight. Such reduces fleet operating costs by lowering the overall number of trucks required for a particular parcel delivery business.

It is also an object to show a hoist/lift system which is arranged and positioned to provide the maximum amount of space for larger parcels transported by delivery vehicles.

These and other objects and advantages of the invention will be apparent to those of skill in the delivery arts from the description which follows.

PRIOR ART PATENTS AND DESIGNS

During the course of preparing this specification for submission to the United States Patent and Trademark Office, a full search of the prior art was conducted.

U.S. Pat. No. 4,236,747 issued to Ratliff in 1980 shows the use of a compartmentalized delivery truck and a pair of I-beams extending from front to rear along the truck roof on top of all the cargo bays. Such provides for enhanced delivery and unloading of various items.

U.S. Pat. No. 4,416,430 issued to Totten in 1983 teaches a special harness assembly for unloading containers from shelves within a delivery truck. A rewind spring and length of cable are used as part of the delivery method.

The method and system described in the present specification are believed to clearly and patentably define over all known prior art teachings.

SUMMARY OF THE INVENTION

A parcel delivery truck is specially outfitted with a hoist, lift or crane unit.

The delivery truck has the standard forward driver's compartment and a compartment for lighter weight packages which are handled by a single driver/operator.

The delivery truck further includes a rear compartment which includes a lift, hoist or crane unit, the components of which are placed along the side walls of the delivery truck. Such design allows the maximum number of heavy parcels and packages to be transported.

The use of such a system as part of an operating method and a business method reduces delivery costs by enabling more and varied work to be done by a single truck and a single operator/driver. Such operating cost savings can be passed on the consumer so the parcel delivery company is more competitive in the package transport business.

BRIEF DESCRIPTION OF THE DRAWING FIGURES

FIGS. 1a-1f show a hoist, lift or crane unit in various opening and closing positions. This type of lift, when placed in a vertical position in a delivery truck, is advantageous for delivering heavier parcels or packages.

FIG. 2 is a side schematic view of a parcel delivery truck and illustrates the light load and heavy load compartments with a hoist or lift placed in the heavy load compartment.

FULL DESCRIPTION OF THE PREFERRED EMBODIMENTS

Figure 3:
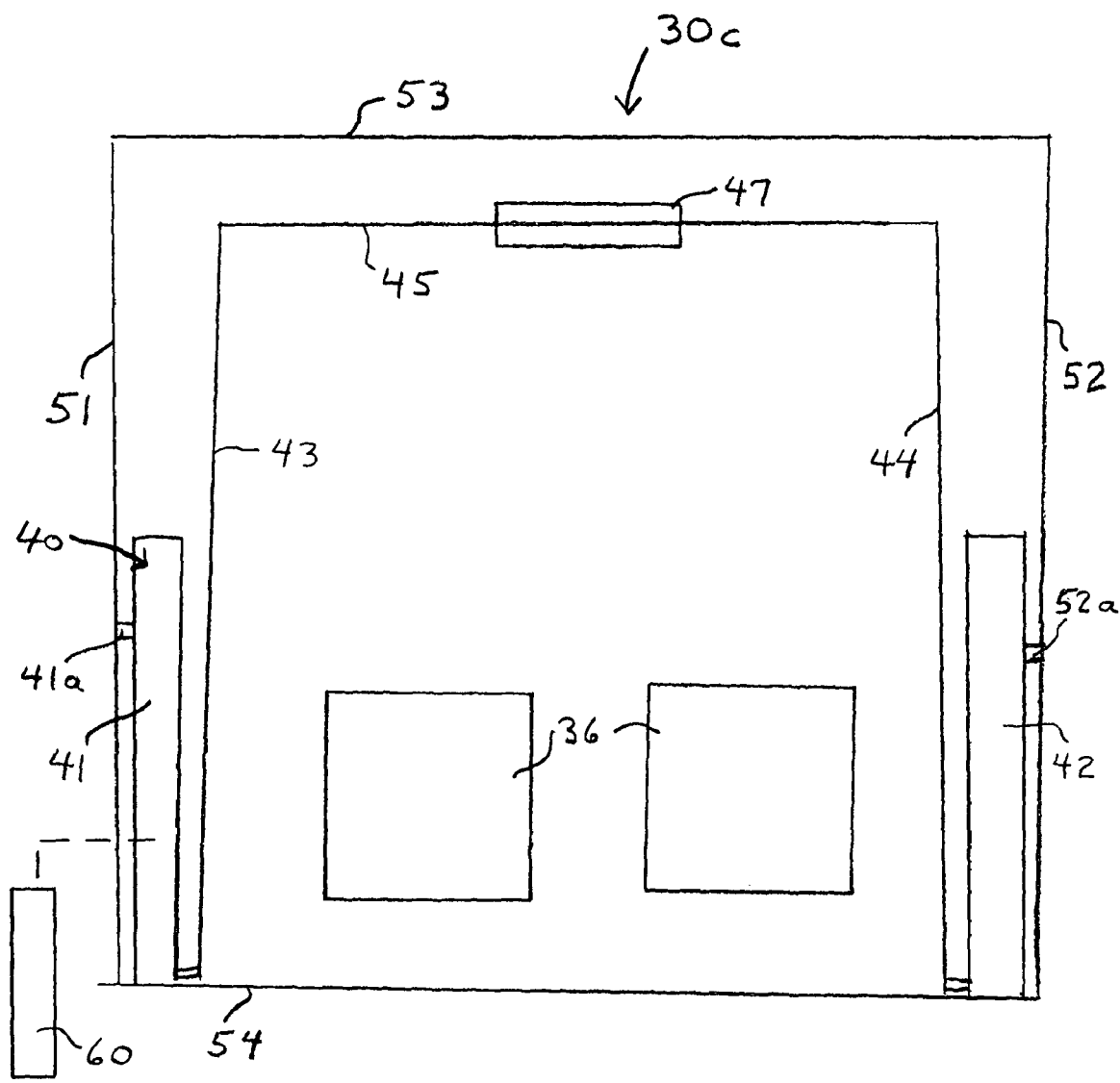
FIG. 3 is a rear schematic view of a heavy parcel compartment of a delivery truck. Details of the location of the lift components, being adjacent to the side walls of the truck, are illustrated.

Referring to the drawing figures, FIGS. 1a through 1f show a lift, hoist or crane unit 10.

The various components are numbered in FIG. 1c as follows:

a pair of arms 11 and 12 are connected by a cross-arm indicated at numeral 14;

the lower ends of arms 11 and 12 have angled rocker elements 17 and 18;

numerals 21 and 22 indicate lower support and drive elements;

the ends of the drive elements are shown at numerals 23 and 24 as angled to receive the angled upper rocker elements;

A winch unit is shown at numeral 16.

The winch unit 16 is utilized to pick up a load 29 as indicated in FIG. 1f.

As indicated in the progression of FIGS. 1a through 1f, the upper arms 11,12 and the cross member 14 are driven through various angles from zero degrees in FIG. 1a to about 135 degrees in FIG. 1f.

The present invention utilizes a variation of the hoist or lift of FIGS. 1a-1f wherein the drive portion of the lift is placed in a vertical position and fixed to side walls of the delivery truck as will be further described.

Referring to FIG. 2, a side schematic view of a typical parcel delivery truck is shown.

Delivery truck 30 has a forward compartment 30a for a driver/operator positioned at area 33.

Delivery truck 30 further has a middle compartment 30b wherein smaller and lower weight parcels 31 are stored on shelving units 32.

Delivery truck 30 also has a rear compartment 30c with a rear slide-up door 35 movable up and down as indicated schematically by arrows 35a.

Rear compartment 30c is shown as containing larger and heavier weight packages indicated at 36. Such heavy packages would not normally be transported by a delivery truck being operated by a single driver because of the inherent unloading difficulties.

The side schematic view of FIG. 2 also shows, in delivery truck rear compartment 30c, a hoist or lift unit 40.

Referring to FIG. 3, showing a rear schematic view of truck compartment 30c, the truck rear compartment has a left side wall 51 and a right side wall 52. Top and bottom truck walls are shown at numerals 53 and 54 respectively.

FIG. 3 further shows hoist or lift unit 40 as having a left side drive portion 41 which is fixed to side wall 51 via suitable attaching element 41a. A right side drive portion 42 is fixed to truck side wall 52 by attaching means 52a.

As further shown in FIG. 3, the lift includes a movable load carrying unit comprising a left leg 43, a right leg 44 and an upper cross bar 45 with a winch 47 attached thereto.

As shown, a lower part of leg 43 is connected to a lower part of drive portion 41.

Similarly, a lower part of leg 44 is connected to a lower part of drive portion 42.

It is an important aspect of the invention that the left side drive 41, the right side drive 42 and the legs 43 and 44 are positioned as closely as possible to the truck side walls 51 and 52.

Such allows the maximum amount of room for heavier parcels 36 and thus increases the load carrying ability of the overall delivery system.

The remote control function, i.e. operation of the lift or hoist by a single driver/operator, is indicated by numeral 60 and the dashed line extending therefrom.

Figure 4:
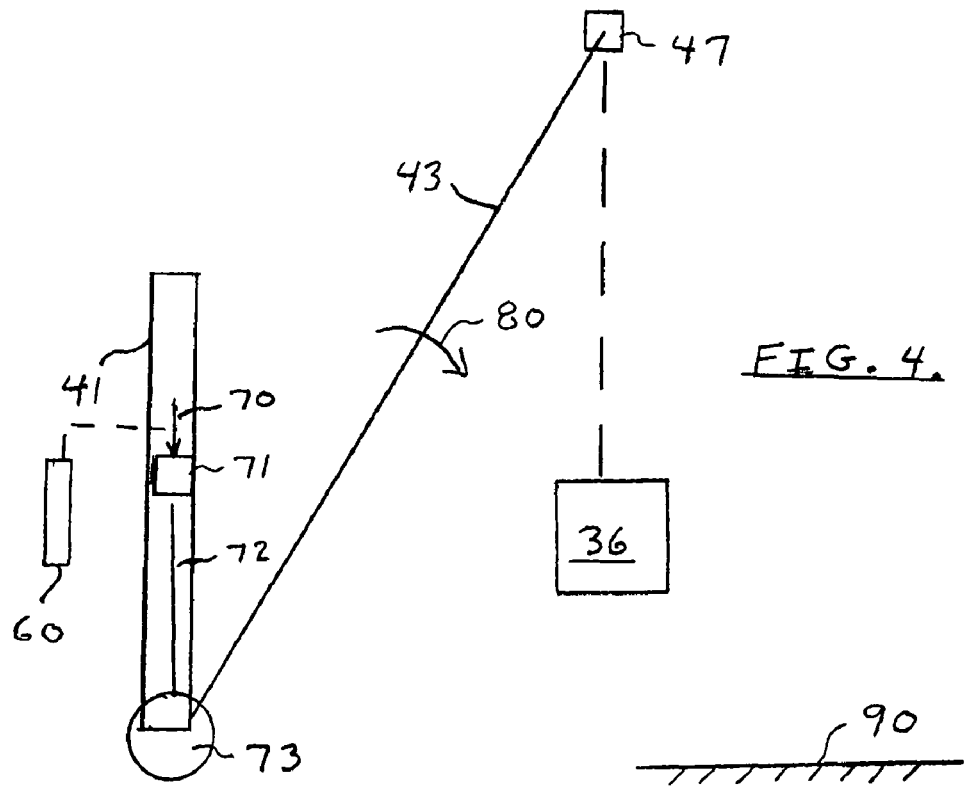
FIGS. 4 and 5 are schematic side views of a part of the lift or hoist as it unloads a heavy parcel to an unloading area and as it returns to a vertical position.
Figure 5:
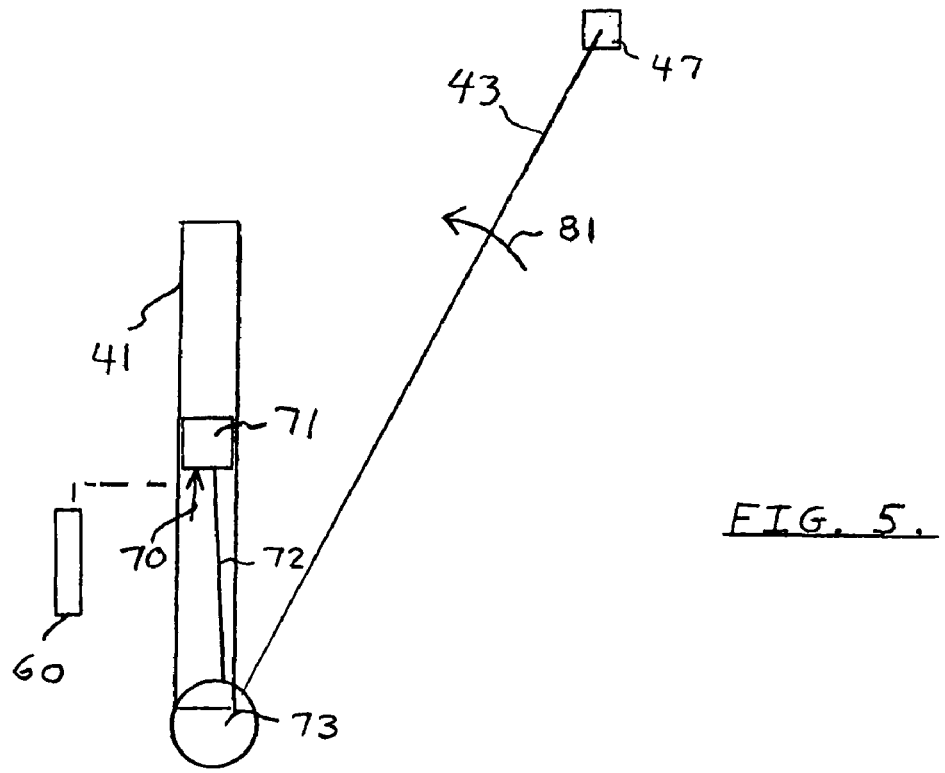

FIGS. 4 and 5 are side schematic views of the hoist or lift components in their respective positions as they unload a heavy package 36 onto an unloading or delivery area and return the movable part of the hoist to a vertical position.

FIG. 4 shows one example of the type of drive unit which may be utilized in practice of the invention.

A fixed drive unit 41 has a piston 71 therein. Upon remote operation by an operator, hydraulic fluid 70 acts to push piston and actuator 72 downward. This causes a gear or wheel 73 to turn. Such is connected to a lower end of the movable load carrying unit 43.

The movable load carrying unit 43 with winch 47 and heavy load 36 rotates as indicated by arrow 80 to move the load to a deposit point 90.

As shown in FIG. 5, upon remote control by actuator 60, hydraulic fluid 70 acts on the underside of piston 71 to move it upward.

Through the linked system, the movable load carrying unit 43 is moved upwardly as indicated by arrow 81.

The movable load carrying unit 43 is moved back to a vertical position and ready to unload another heavy load at the option of an operator.

The method and business method steps involved in the practice of the invention are as follows:
  providing a parcel delivery truck having compartments for lighter packages and heavier packages,
  providing a specially positioned hoist or lift unit in a rear compartment of the truck for unloading heavier packages,
  providing that the hoist or lift components are located at side walls of the truck for optimal heavy package transport and unloading.

While a particular system and method of operation have been shown and described, it is intended to cover equivalent systems and methods which would reasonably occur to those of skill in the art.

I claim:

1. In combination, a delivery truck having a first forward compartment(30a) comprising a drive's area,
  said delivery truck having a second middle com-partment (30b) being directly accessible by a driver without leaving the delivery truck, said second middle compartment containing only packages (31) of lighter weight which can be manually carried by a driver,
  said delivery truck having a third rear compartment(30c) which contains only packages (36) of heavier weight which cannot be manually carried by a driver,
  wherein said delivery truck has a sliding rear door(35),
  wherein said third rear compartment has a crane or lift means positioned therein for moving only the packages of heavier weight,
  wherein said crane or lift has two lower drive portions(41, 42) and two upper movable portions(43,44),
  wherein each of said lower drive portions are permanently attached in a vertical position to side walls(51,52) of said third rear compartment,
  wherein each of said permanently attached lower drive portions(41,42) has hydraulic drive means(71) for moving the upper movable portions,
  the combination including a cross-bar(45) extending between the upper movable portions which has a winch (47) mounted thereon,
  remote control means(60) for controlling the operation of the crane or lift.

* * * * *